United States Patent
Kovács et al.

(10) Patent No.: US 10,477,032 B2
(45) Date of Patent: Nov. 12, 2019

(54) DETAILED CALL RECORDS FOR VOICE OVER LTE CALLS

(71) Applicant: Telefonaktiebolaget LM Ericsson (publ), Stockholm (SE)

(72) Inventors: László Kovács, Martonvásár (HU); Attila Báder, Paty (HU); Jeno Hajdu, Budapest (HU); György Szaniszló, Budapest (HU); Ferenc Szász, Budapest (HU)

(73) Assignee: TELEFONATIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/754,646

(22) PCT Filed: Aug. 26, 2016

(86) PCT No.: PCT/IB2016/055120
§ 371 (c)(1),
(2) Date: Feb. 23, 2018

(87) PCT Pub. No.: WO2017/037598
PCT Pub. Date: Mar. 9, 2017

(65) Prior Publication Data
US 2018/0198924 A1    Jul. 12, 2018

Related U.S. Application Data

(60) Provisional application No. 62/211,285, filed on Aug. 28, 2015.

(51) Int. Cl.
*H04M 11/00*    (2006.01)
*H04M 15/00*    (2006.01)
(Continued)

(52) U.S. Cl.
CPC ........ *H04M 15/56* (2013.01); *H04L 12/1403* (2013.01); *H04M 15/41* (2013.01);
(Continued)

(58) Field of Classification Search
CPC ...... H04M 15/56; H04M 15/41; H04M 15/58; H04M 15/59; H04M 15/62; H04L 12/1403; H04L 65/1016
(Continued)

(56) References Cited

U.S. PATENT DOCUMENTS 8,565,150 B2 * 10/2013 Hu ........................ H04W 88/16
                                                        370/328
8,565,793 B1 * 10/2013 Koodli .................. H04W 68/04
                                                        370/329
(Continued)

FOREIGN PATENT DOCUMENTS

WO    2013007291 A1    1/2013

OTHER PUBLICATIONS

ETSI—"Digital cellular telecommunications system (Phase 2+); Universal Mobile Telecommunications System (UMTS); L TE; Telecommunication management; Charging management; Charging Data Record (CDR) parameter description (3GPP TS 32.298 version 11.13.0 Release 11 )", Technical Specification, European Telecommunications Standards Institute (ETSI), 650, Route Des Lucioles ; F-06921 Sophia-Antipolis; France, vol. 3GPP SA 5, No. v11.13.0, Apr. 1, 2015 (Apr. 1, 2015).

*Primary Examiner* — Marceau Milord
(74) *Attorney, Agent, or Firm* — Coats & Bennett, PLLC

(57) ABSTRACT

A performance monitoring system and method is based on a Detailed Call Record (DCR). A DCR contains records of events occurring in different network domains (14, 20, 40) that are related to a single, specific VoLTE call. The DCR events for each VoLTE call cover all legs of the call, and for
(Continued)

each call leg, the relevant events are ordered by time. A DCR also contains basic information to identify the call: the IMS Charging Identifier (ICID), the International Mobile Subscriber Identity (IMSI) of all involved subscribers, and the start and stop timestamps of the call. A DCR has all the relevant user plane measurement, radio measurement, and control plane data from all the involved domains (14, 20, 40) for all call legs of a VoLTE call, in contrast to prior art systems that focus only on a single subscriber's activities for a given call. The DCR thus provides a complete view of the call, allowing more complete analytics and troubleshooting. Furthermore, the data are collected and assembled automatically, with results available real-time, or with a few seconds delay.

19 Claims, 8 Drawing Sheets

(51) Int. Cl.
*H04L 12/14* (2006.01)
*H04L 29/06* (2006.01)

(52) U.S. Cl.
CPC ............ *H04M 15/58* (2013.01); *H04M 15/59* (2013.01); *H04M 15/62* (2013.01); *H04L 65/1016* (2013.01)

(58) Field of Classification Search
USPC .......................................... 455/405, 411, 445
See application file for complete search history.

(56) References Cited

U.S. PATENT DOCUMENTS

| | | | | |
|---|---|---|---|---|
| 8,687,556 | B2* | 4/2014 | Eipe | H04W 76/10 370/328 |
| 8,811,363 | B2* | 8/2014 | Velasco | H04L 12/1403 370/338 |
| 9,369,569 | B1 | 6/2016 | Lam et al. | |
| 9,544,337 | B2* | 1/2017 | Eswara | H04L 65/103 |
| 9,641,964 | B2* | 5/2017 | Kulkarni | H01Q 1/24 |
| 10,165,475 | B2* | 12/2018 | Shan | H04W 36/0022 |
| 2001/0054024 | A1 | 12/2001 | Schweitzer | |
| 2003/0002480 | A1* | 1/2003 | Giustina | H04L 29/1216 370/352 |
| 2005/0152275 | A1 | 7/2005 | Laurila et al. | |
| 2007/0100981 | A1* | 5/2007 | Adamczyk | H04L 69/18 709/223 |
| 2008/0162637 | A1* | 7/2008 | Adamczyk | H04L 51/043 709/204 |
| 2009/0270099 | A1* | 10/2009 | Gallagher | H04W 8/08 455/435.1 |
| 2010/0041365 | A1* | 2/2010 | Lott | G06Q 30/016 455/406 |
| 2010/0085978 | A1* | 4/2010 | Ramankutty | H04L 12/14 370/401 |
| 2010/0128860 | A1 | 5/2010 | Kung et al. | |
| 2011/0047256 | A1* | 2/2011 | Babu | H04L 29/12367 709/223 |
| 2012/0224528 | A1 | 9/2012 | Tapia et al. | |
| 2012/0300639 | A1* | 11/2012 | Janakiraman | H04L 41/12 370/241 |
| 2013/0017805 | A1 | 1/2013 | Andre-Jonsson et al. | |
| 2013/0021933 | A1* | 1/2013 | Kovvali | H04W 88/18 370/252 |
| 2013/0128873 | A1* | 5/2013 | Eipe | H04W 76/10 370/338 |
| 2013/0336118 | A1* | 12/2013 | Shaw | H04L 41/0813 370/235 |
| 2014/0071967 | A1* | 3/2014 | Velasco | H04L 12/1403 370/338 |
| 2014/0073288 | A1* | 3/2014 | Velasco | H04W 4/02 455/411 |
| 2014/0073289 | A1* | 3/2014 | Velasco | H04W 12/04 455/411 |
| 2014/0119196 | A1* | 5/2014 | Hui | H04W 24/10 370/241 |
| 2014/0153504 | A1* | 6/2014 | Wang | H04W 28/14 370/329 |
| 2014/0213219 | A1* | 7/2014 | Mohebbi | H04W 92/02 455/411 |
| 2014/0219272 | A1* | 8/2014 | Shuman | H04L 65/1016 370/352 |
| 2014/0242939 | A1* | 8/2014 | Salot | H04W 4/24 455/406 |
| 2015/0055653 | A1* | 2/2015 | Suryavanshi | H04L 65/1073 370/392 |
| 2015/0063346 | A1* | 3/2015 | Eswara | H04L 65/103 370/352 |
| 2015/0071125 | A1* | 3/2015 | Wang | H04L 12/1407 370/259 |
| 2016/0142931 | A1* | 5/2016 | Mondal | H04L 67/141 370/252 |
| 2016/0344635 | A1* | 11/2016 | Lee | H04L 47/20 |
| 2016/0373944 | A1* | 12/2016 | Jain | H04L 43/50 |
| 2017/0034743 | A1* | 2/2017 | Draznin | H04W 36/0022 |
| 2019/0013857 | A1* | 1/2019 | Zhang | H04B 7/0695 |

* cited by examiner

NETWORK DATA COLLECTION MODULE
202

PRE-CORRELATION MODULE
204

CORRELATION MODULE
206

*FIG. 9*

DETAILED CALL RECORDS FOR VOICE OVER LTE CALLS

RELATED APPLICATIONS

This application claims priority to U.S. Provisional patent Application Ser. No. 62/211,285 filed Aug. 28, 2015, the entire contents of which are incorporated herein by reference.

FIELD OF INVENTION

The present invention relates generally to performance monitoring in wireless communication networks, and in particular to an automated, (near) real-time system and method for performance monitoring of Voice over LTE (VoLTE) networks based on detailed call records.

BACKGROUND

Wireless communication networks are ubiquitous in many parts of the world. A modern wireless communication network is, in many respects, a complex dynamic system, in which system parameters are constantly monitored and adjusted, to attempt optimal operation in the face of changes in traffic load, usage patterns, channel quality, and other dynamic factors.

In early-generation wireless communication networks (e.g., Wideband Code Division Multiple Access, or WCDMA and Global System for Mobile communications, or GSM), voice services were delivered over circuit switched (CS) domains. CS networks provide guaranteed transport services for voice traffic, which is very sensitive to packet-level transmission characteristics, such as delay and loss or jitter. The Third Generation Partnership Project (3GPP) Long Term Evolution (LTE) was originally designed for high speed data transfer, and does not include circuit switched domains. Still, there is a strong motivation to support voice service over LTE networks. Voice over LTE (VoLTE) is much more bandwidth efficient than WCDMA and GSM voice. Once a good LTE coverage is achieved, the older network technologies (e.g., WCDMA and GSM) can be phased out and the frequency bands can be reused for newer, more efficient network technologies. LTE networks span numerous domains, or technologies, each optimized for different aspects of communication network operation.

FIG. 1 depicts a diagram of some relevant nodes in an LTE network 10, grouped into three domains: the Radio Access Network (RAN) domain 14, the Evolved Packet Core (EPC) domain 20, and the IP Multimedia Subsystem (IMS) domain 40.

The radio access network (RAN) provides wireless connectivity between a large number of (possibly mobile) User Equipment (UE) 12, such as smartphones, machine-to-machine (M2M) devices, laptop or tablet computers, and the like, and fixed terrestrial base stations (E-NodeB, or eNB) 16a, 16b.

The LTE RAN 14, e.g., Evolved Universal Mobile Telecommunications System (UMTS) Terrestrial RAN, or E-UTRAN, is connected to the Evolved Packet Core (EPC) domain 20. EPC 20 is an IP-based multiservice core network providing end-to-end service delivery for user traffic and ensuring signaling-based mobility management in access networks. The EPC is a split architecture network, where the user and signaling plans are separated and handled by different network entities. Important EPC 20 functionalities include the Home Subscriber Server (HSS) 26, a node that maintains a database containing the user and subscriber related information, and also is involved in session setup, authentication and authorization. The Serving Gateway (SGW) 24 is the gateway between the RAN 14 and the EPC 20, while the Packet Data Network Gateway (PGW) 28 connects the EPC 20 to external IP networks, such as the Internet 32 and IMS domain 40. PGW 28 includes IP address translation, and communicates with the Policy and Charging Rules Function (PCRF) 30. The Mobility Management Entity (MME) 22 is a signaling node, responsible for tracking and mobility of the UE 12 in the RAN 14.

An IP Multimedia Subsystem (IMS) domain 40 provides the control and media functions for voice and other real-time multimedia services in LTE networks 10. The IMS signaling protocol is the Session Initiation Protocol (SIP), which is standardized by the Internet Engineering Task Force (IETF). IMS 40 includes the Call Session Control Functions (P-CSCF 44, I-CSCF 48, and S-CSCF 46). The Proxy-CSCF (P-CSCF) 44 is a SIP proxy that is the first point of contact for the IMS domain 40. It acts as an anchor point to the IMS 40—encrypting and decrypting outgoing and incoming traffic, respectively. Interrogating-CSCF (I-CSCF) 48 is another IMS function serving as an edge node of the IP administrative domain. It includes a Domain Name System (DNS) address, enabling external servers to find the IMS system 40. Serving-CSCF (S-CSCF) 46 is a central SIP server performing session control and SIP registration. It connects the different SIP addresses and user profiles. Diameter protocol is used by S-CSCF 46 to obtain user profiles from HSS 26 in the EPC domain 40. Application Servers (AS) 52 host and control various services, such as voice, video, gaming, etc. An E.164 Number to URI Mapping (ENUM) node 50 translates telephone numbers into internet addresses. The ENUM 50 connects to a telephony AS providing various voice call services. Other networks may connect to the IMS domain 40, such as the Public Switched Telephone Network (PSTN) 34.

The complex network architecture and variety of network functionalities involved in providing multimedia services in mobile networks 10 require a performance monitoring and troubleshooting system that assures proper network operation and achievement of contracted services level. Such systems collect data from a variety of source, such as the network interfaces, terminals, and from the network node logs. In a mobile network 10, a very large amount of data is produced; therefore the management systems usually work on well selected data. Network nodes usually have performance management functions that are based on statistical counters. These contain time-aggregated data which may further be aggregated for other dimensions, cells, users, services, etc. Network nodes also generate event data in the form of streaming events or network logs. These contain more detailed information of the network operation. The active counters and events are configurable.

In the network interfaces, network probes generate an output of the protocol information. Performance monitoring systems collect this information. Since there are many network entities which are involved in the network operation, these data have to be collected and correlated from many network sources, in order to be able to obtain adequate information from end-to-end sessions or services.

Although counter based network management systems are suitable for high-level performance monitoring (PM), because they are based on statistical data, the details and individual problems are hidden. These systems are deficient for monitoring service levels of individual subscribers, and for troubleshooting.

In the case of event-based monitoring systems, the output is often time-aggregated, which has similar drawbacks to the counter-based systems. In case of failures, the call details are not available for detailed troubleshooting.

In many PM solutions, where data are available at the subscriber level, data for one user are correlated. The originating and terminating sides of calls, and PM data of the participating parties, are either not visible, or not correlated with each other in the output of the PM system.

Furthermore, most of the existing monitoring systems, even if they provide per-user information, only work within one domain (e.g., RAN 14, EPC 20, IMS 40, etc.) and do not perform cross-domain correlation. These systems can monitor and detect problems within a specific domain, but cannot map this information into end-to-end performance metrics due to a lack of information from other domains.

Using existing monitoring systems, network operators can collect cross-domain information, but they need to use multiple, (e.g., four to five) different monitoring solutions, and perform extensive manual "correlation like" steps to collect the information and put it in a useable form. Due to the extensive manual intervention, operators cannot apply their analysis for all of the customers; rather, it is limited to only certain specified users, such as drive testers. Furthermore, the typical delay in accessing and correlating this information is on the order of 30-45 minutes, at best.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, at least some of the above described deficiencies in the prior art are alleviated by a performance monitoring system and method based on a Detailed Call Record (DCR). A DCR contains records of events occurring in different network domains 14, 20, 40 that are related to a single, specific VoLTE call. The DCR events for each VoLTE call cover all legs of the call, and for each call leg, the relevant events are ordered by time. A DCR also contains basic information to identify the call: the IMS Charging Identifier (ICID), the International Mobile Subscriber Identity (IMSI) of all involved subscribers, and the start and stop timestamps of the call. A DCR has all the relevant user plane measurement, radio measurement, and control plane data from all the involved domains for all call legs of a VoLTE call, in contrast to prior art systems that focus only on a single subscriber's activities for a given call. The DCR thus provides a complete view of the call, allowing more complete analytics and troubleshooting. Furthermore, the data are collected and assembled automatically, with results available real-time, or with a few seconds delay.

The correlated data may be assembled into a DCR by generating a DCR comprising a header including one or more of a type of call, user IDs, call ID, and start and stop timestamps; start and end conditions for the call including one or more of location, radio environment metrics, and bearer information; and detailed event level information from at least one network domain selected from the group consisting of radio access network 14, evolved core network 20, and IP multimedia subsystem 40.

The detailed event level information from the evolved core network 20 may include one or more of session and bearer setup information, session and bearer management information, QoS information, handover information, and location.

The detailed event level information from the radio access network 14 may include one or more of radio environment statistics, handover information, radio environment statistics during handover, cell quality information, and cell health.

The detailed event level information from the IP multimedia subsystem 40 may include one or more of Registration, call setup, and call release.

One embodiment relates to a method of generating a DCR for a VoLTE call in an LTE wireless communication network. For each leg of the call, network data associated with the call from all involved domains are collected using domain-specific identifiers associated with a subscriber. For each leg of the call, the collected data are pre-correlated by mapping the domain-specific identifiers to a common identifier associated with a subscriber. The data are correlated across all legs of the call, using the common identifiers, to generate a DCR including all events, across all domains, for all legs of the call.

Another embodiment relates to a computer communicatively connected to an LTE wireless communication network, and operative to generate a DCR for a VoLTE call in the LTE network. The computer includes communication circuits operative to exchange data with one or more LTE network nodes. The computer also includes processing circuitry operatively connected to the communication circuits. The processing circuitry is operative to, for each leg of the call, collect network data associated with the call from all involved domains using domain-specific identifiers associated with a subscriber; for each leg of the call, pre-correlate the collected data by mapping the domain-specific identifiers to a common identifier associated with a subscriber; and correlate the data across all legs of the call, using the common identifiers, to generate a DCR including all events, across all domains, for all legs of the call.

Yet another embodiment relates to a non-transitory computer-readable medium containing program instructions which, when executed on processing circuitry communicatively coupled to an LTE wireless communication network, are operative to cause the processing circuitry to generate a DCR for a VoLTE call in the LTE network by performing the steps of: for each leg of the call, collecting network data associated with the call from all involved domains, using domain-specific identifiers associated with a subscriber; for each leg of the call, pre-correlating the collected data by mapping the domain-specific identifiers to a common identifier associated with a subscriber; and correlating (106) the data across all legs of the call, using the common identifiers, to generate a DCR including all events, across all domains (14, 20, 40), for all legs of the call.

Still another embodiment relates to an apparatus communicatively connected to an LTE wireless communication network, and operative to generate a DCR for a VoLTE call in the LTE network, the apparatus adapted to: for each leg of the call, collect network data associated with the call from all involved domains using domain-specific identifiers associated with a subscriber; for each leg of the call, pre-correlate the collected data by mapping the domain-specific identifiers to a common identifier associated with a subscriber; and correlate the data across all legs of the call, using the common identifiers, to generate a DCR including all events, across all domains, for all legs of the call.

Still another embodiment relates to a computer program, comprising instructions which, when executed on processing circuitry are operative to cause the processing circuitry to carry out the method according to method claims.

Still another embodiment relates to an apparatus communicatively connected to an LTE wireless communication network, and operative to generate a DCR for a VoLTE call in the LTE network. The apparatus comprises a first module configured to, for each leg of the call, collect network data associated with the call from all involved domains using domain-specific identifiers associated with a subscriber. The apparatus comprises a second module configured to, for each leg of the call, pre-correlate the collected data by mapping the domain-specific identifiers to a common identifier associated with a subscriber. The apparatus comprises a third module configured to correlate the data across all legs of the call, using the common identifiers, to generate a DCR including all events, across all domains, for all legs of the call.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 9 is a block diagram of a virtual function module architecture operative to generate DCRs.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Overview

Embodiments of the present invention provide a data collection, correlation, and analysis system for (near) real-time, automated, cross-domain VoLTE call monitoring and troubleshooting. The system eliminates the expensive drive tests and human analysis of collected log files. The inventive system monitors multiple domains of the wireless communication network (including, but not limited to, RAN 14, EPC 20, and IMS 40), collects extensive information related to VoLTE calls, performs cross-domain correlation, and generates Detailed Call Records (DCR). These DCRs contain information from all legs (mobile originating and terminating) of a VoLTE call. As used herein, a "leg" of a call includes all network nodes involved in delivering VoLTE service to a user terminal. For example, a two-party (mobile-to-mobile) call has two legs; a conference call may have as many legs as participants.

Figure 2:
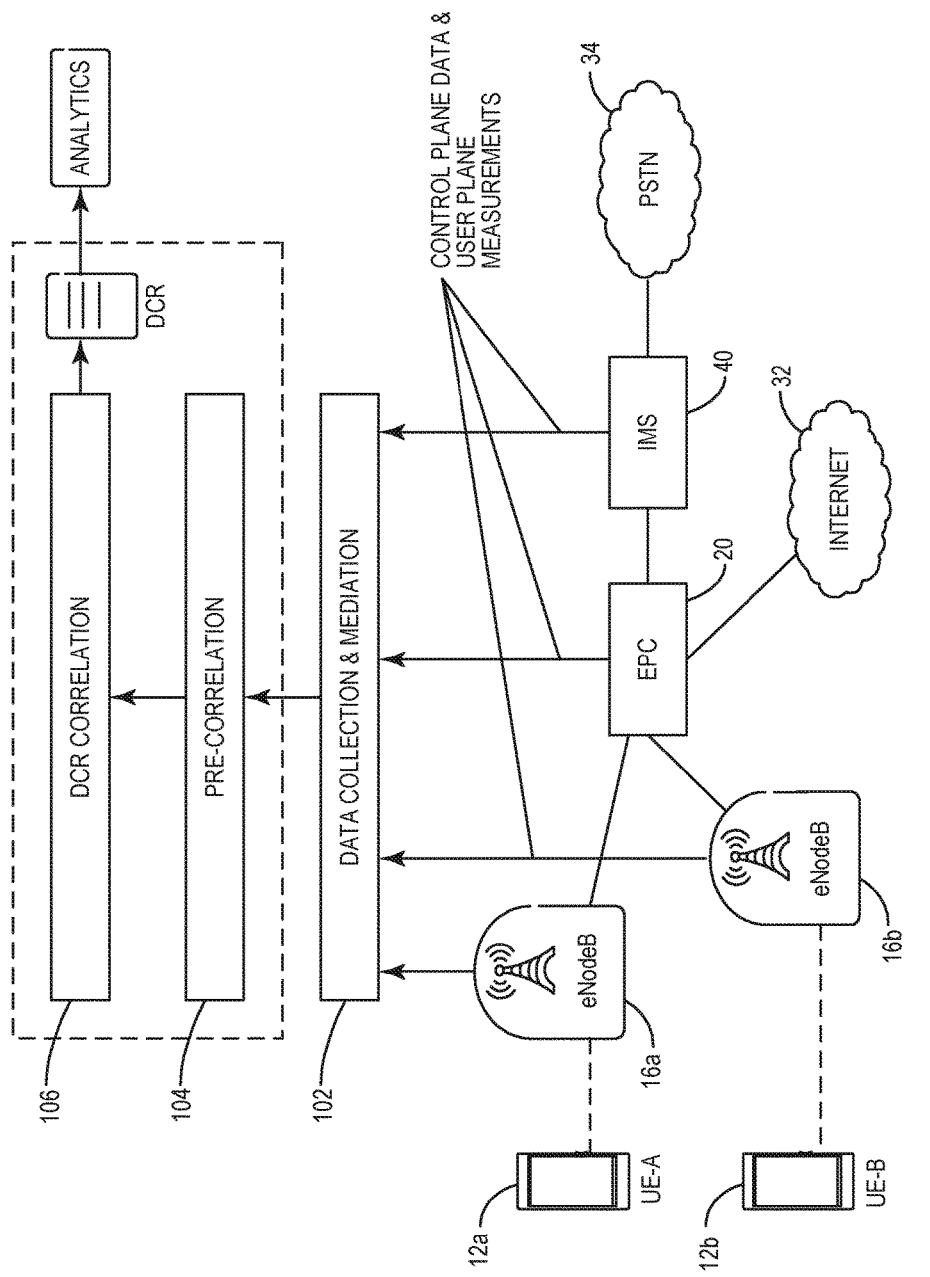
FIG. 2 is a functional block diagram of a performance monitoring system in an LTE network.
Figure 3:
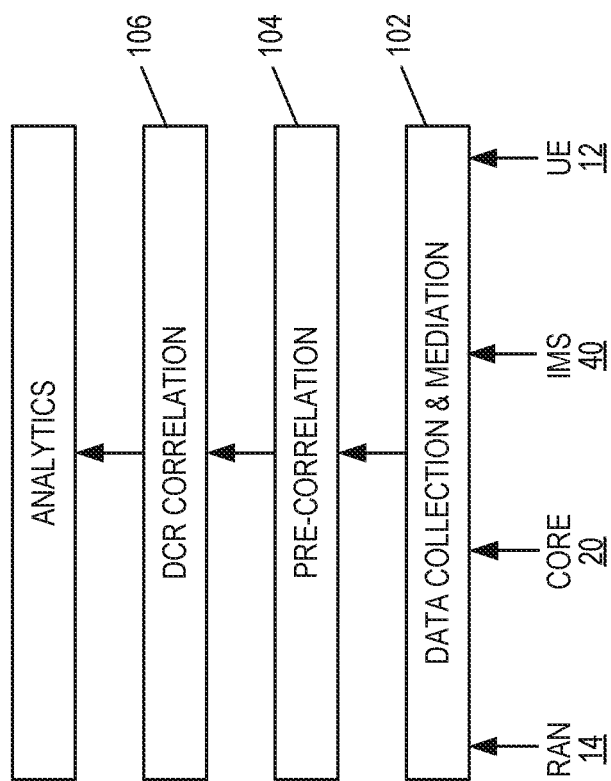
FIG. 3 is a layered architecture diagram of a performance monitoring system.

The inventive real-time system creates DCRs in three steps (see FIGS. 2 and 3). First, in a data collection step, the state of being involved in a VoLTE call is tracked at the individual subscribers' levels based on SIP messages. Events in the call's timeframe for the subscriber(s) are collected in all the involved domains, using domain-specific identifiers, such as the IMS Charging Identifier (ICID). Second, in a pre-correlation step, the domain-specific identifiers for the data and events are mapped to a common identifier, such as the International Mobile Subscriber Identity (IMSI). Third, in a correlation step, the data for the individual call legs is assembled to create the call's complete DCR.

The DCR may then be analyzed, monitored, used to troubleshoot problems, and the like. The DCR may be sent to a performance monitoring node or the like in a streaming event, or it may be stored in a file or database for selective retrieval and analysis. The DCR is further processed by higher network layer components, where rules-based processing, aggregation, or other processing can be implemented to support different troubleshooting and monitoring use cases.

Figure 1:
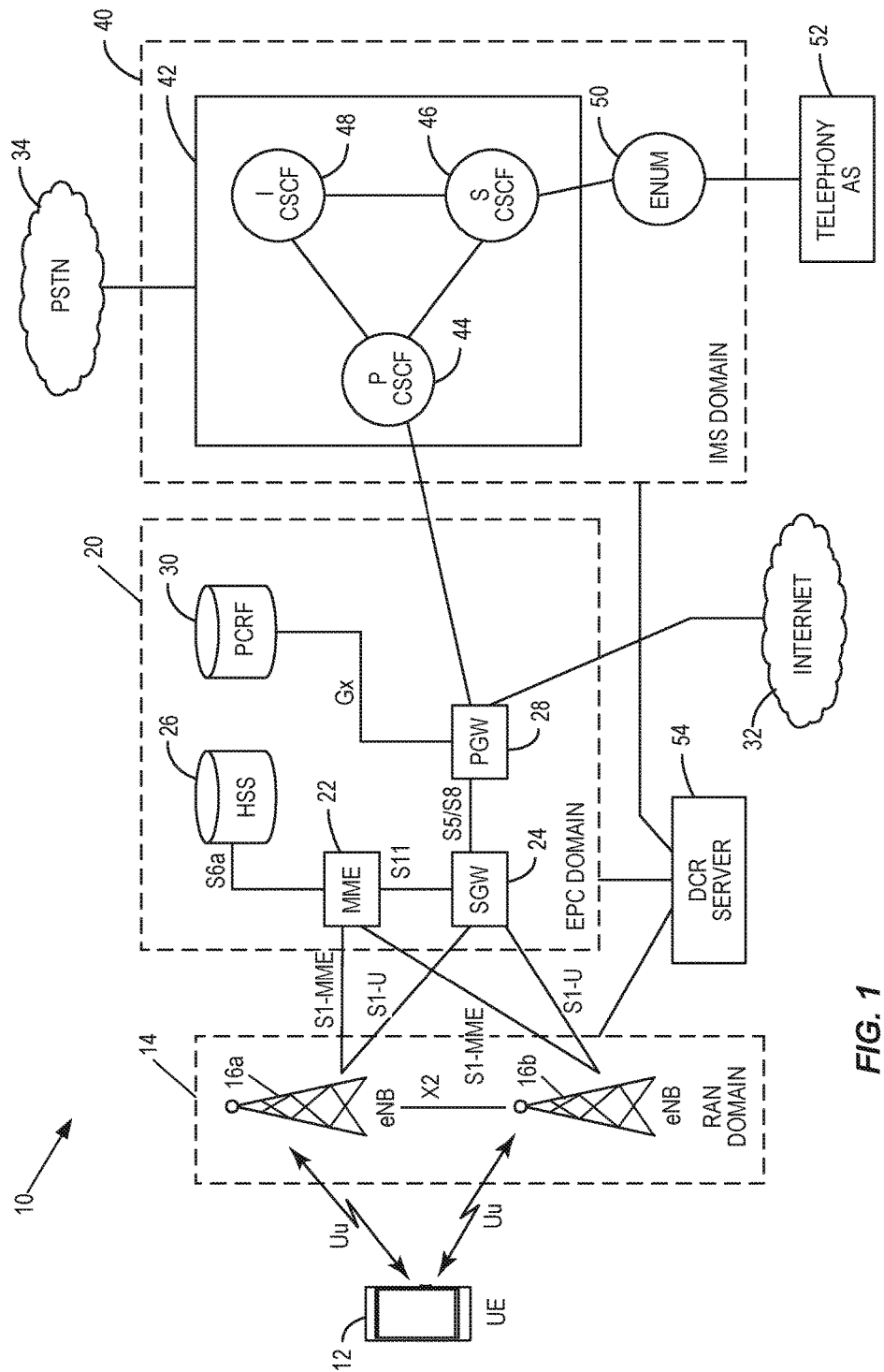
FIG. 1 is a block diagram of an LTE network including RAN, EPS, and IMS domains.

The DCR may be assembled by a dedicated DCR server 54 (FIG. 1), which is not a part of any of the monitored domains 14, 20, 40. As used herein "server" is a functional term, such as used in the phrase "application server," and does not limit the type or architecture of the hardware (e.g., client/server distinctions). In general, any suitable computer having processing circuitry and communication circuits operative to exchange messages and data with network 10 nodes, which is appropriately programmed, may function as a DCR server 54.

FIG. 2 provides a general overview of the inventive system. The DCR server collects, e.g., control plane data and user plane measurements from UEs 12 via eNBs 16 in the RAN 14, from the EPC 20, and from the IMS 40 for each leg of a VoLTE call. After data collection and mediation 102, the data are processed in a pre-correlation step 104 to ensure a consistent identifier across all domains 14, 20, 40 for each leg. In a DCR correlation step 106, the data from all legs of the call are correlated to generate a full DCR. The DCR—containing extensive information on a single VoLTE call, across all domains, and for all call legs—is then available for analytics and other processing.

FIG. 3 depicts the functional steps in a process of generating a DCR (corresponding to a method described with reference to FIG. 5). The specific steps in this process are described in detail below.

Data Collection and Mediation

In this step 102, data are collected separately for each leg of the call, from different domains (including, but not limited to, RAN 14, EPC 20, and IMS 40), and prepared for further processing. The data are collected in the form of event streams, network events, and measurement reports. The data are received and processed within seconds after an event occurs in the network. In case of IMS procedures, events are reported at the end of the procedures. Examples of the specific information collected are detailed herein. Data relevant to a VoLTE call are identified by domain-specific identifiers associated with a subscriber in each different domain. For example, an ICID may identify IMS domain 40 events, while an S1APID may identify messages in the EPC domain 20 (See, e.g., 3GPP TS 36.401, § 6.2.1).

Pre-Correlation

The main purpose of the pre-correlation step 104 to ensure that, for each leg of the VoLTE call, events from different domains have uniform keys, such as the IMSI of the subscriber terminating that leg, for identifying individual subscribers' event sequences across all domains. In those domains where IMSI is not readily available in the events, for example in case of LTE radio events where sessions are identified by S1APIDs, the domain-specific IDs are resolved to IMSIs, in order to use the IMSI as the common ID. Domain-specific IDs include, for example, Mobile Station International Subscriber Directory Number (MSISDN), S1APIDs, IP Multimedia Public Identity (IMPU), and user Internet Protocol (IP) addresses. The resolution to IMSI is accomplished by maintaining domain ID—IMSI mappings for each domain, and using them for ID resolution. The pre-correlation step 104 augments the incoming event streams with a common identifier (e.g., IMSI) for each leg of the call, and produces a matching outgoing stream, also in real-time fashion.

Correlation Across Call Legs

Detailed Call Records contain cross-domain correlated information from all legs of a VoLTE call, which form the basis of further analysis. Embodiments of the present invention collect the information from different data sources, as discussed above, identify the users and the VoLTE call ID in a few pre-correlation steps, then correlate the two call legs (or more in case of conference calls) and assemble the correlated information into a DCR. The DCR correlation logic 106 updates call states after each event, and immediately generates a DCR record for a call if an event or an internal timer indicates that the call has ended. This generates a real-time stream of DCRs for further analytics.

Analytics

The collected and correlated information content of a DCR, or multiple DCRs, are used for detailed analysis and troubleshooting. Typical fault cases can be identified manually, automatically by machine learning, or automatically based on predefined conditions. These methods may also be combined.

Data Sources

Some non-limiting examples of information collected from different wireless communication network domains are listed below.
EPC Domain 40:
  Session and bearer setup (e.g. General Packet Radio Service (GPRS) Core Tunneling Protocol, GTP-C, protocol events or MME 22/SGW 24 logs)
  Session and bearer management (e.g. GTP-C protocol events or MME 22/SGW 24 logs)
  QoS information (e.g. GTP-C protocol events or MME 22/SGW 24 logs)
  Handover information (core network signaling or MME 22 logs)
  Location (cell ID, or coordinates)
RAN Domain 14:
  Radio environment statistics (e.g. Radio Resource Control, RRC, measurement report events or eNB 16 logs)
  Handover information (e.g. S1AP protocol events or eNB 16 logs)
  Radio environment statistics during handover (e.g. RRC protocol events or eNB 16 logs)
  Cell quality information (eNB 16 logs)
  Cell congestion (eNB 16 logs)
  Cell status/availability (eNB 16 logs)
IMS Domain 40:
  Registration (IMS 40 signaling)
  Call setup (IMS 40 signaling)
  Call release (IMS 40 signaling)

Detailed Call Record

Detailed Call Records contain cross-domain correlated information about all legs of a VoLTE call and form the basis for further analysis. Embodiments of the present invention collect 102 the information from different data sources mentioned above, identify the users and the VoLTE call ID for each leg in a pre-correlation step 104, then correlate 106 the two call legs (or more in case of conference calls), and assemble the correlated information into a DCR. As discussed above, pre-correlation activities ensure events from different domains have uniform keys, such as the IMSI, for identifying individual subscribers' event sequences.

DCR Generation Logic

Figure 4:
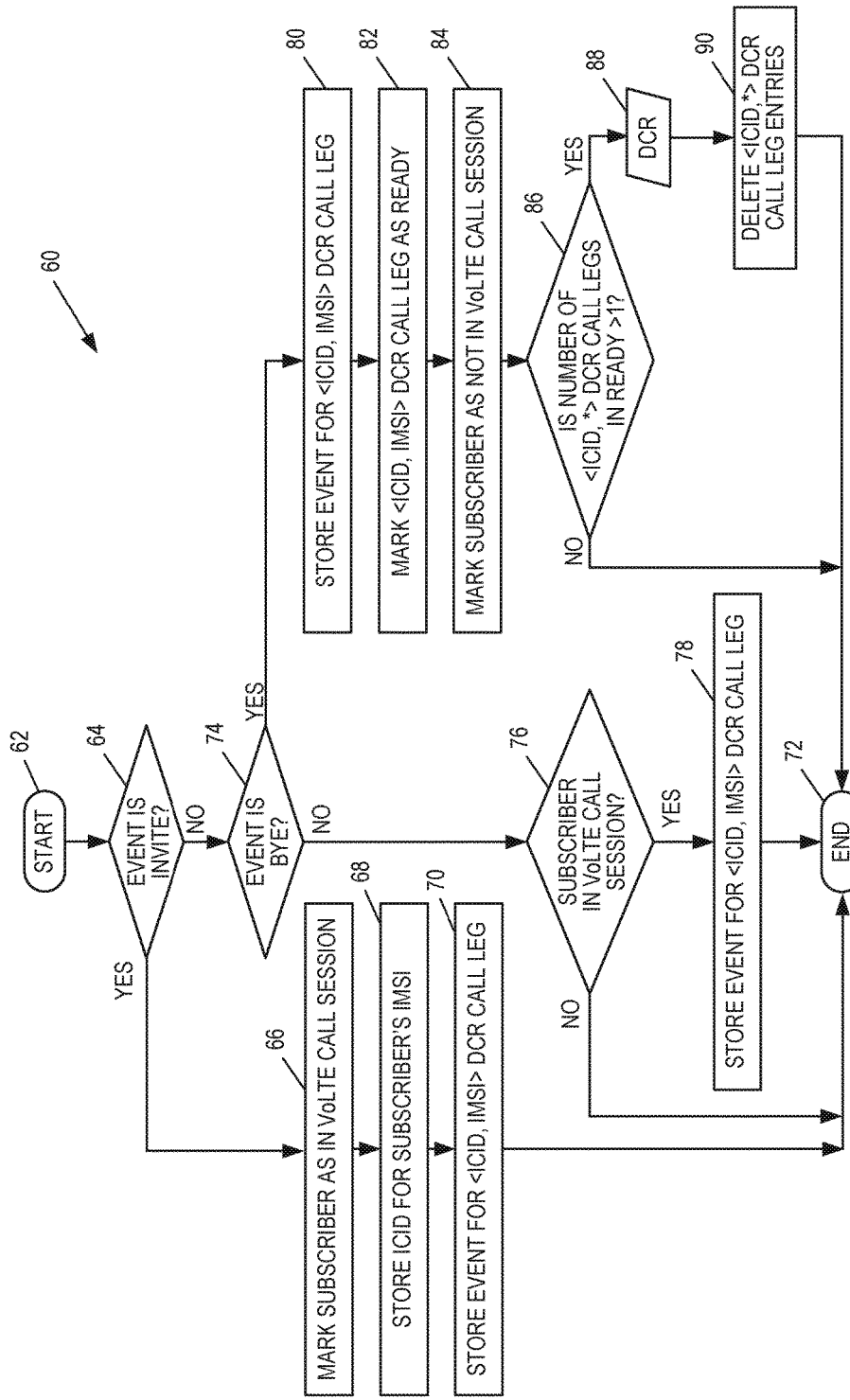
FIG. 4 is a flow diagram of processing an event for a DCR.

FIG. 4 depicts a logic flow 60 for extracting relevant events from a subscriber's activity log—for example, within the IMS domain 40. Events are processed in chronological order as indicated by their timestamps.

Start of a Call Leg and Data Collection

In the embodiment depicted in FIG. 4, the SIP INVITE message is selected as marking the beginning of a call leg, and the timestamp of the SIP INVITE message is selected as the start time of the call leg. As each event enters the DCR logic flow 60 (block 62), it is inspected to determine whether it is a SIP INVITE message (block 64). If so, the associated subscriber is determined to be in a VoLTE call session (block 66). The IMS Charging Identifier (ICID) associated with the subscriber's IMSI is stored (block 68). The ICID is the unique ID of the complete IMS session, and within the IMS session, in all the SIP events for all the involved parties, the ICID is the same. Therefore, the call leg event sequences of a call can be correlated by the ICID. At this point, the domain-specific identifier (ICID) and a common identifier of the subscriber (IMSI) are both known, and an association between them is formed, for the pre-correlation step 104. A mapping—the ICID-IMSI key—is formed, and this key is stored with all subsequent events. For example, the current event—that is, the SIP INVITE message—is stored for this leg of the VoLTE call (block 70), along with the ICID-IMSI key, and the processing of that event ends (block 72).

After data collection for a call leg is "opened" as described above, each subsequent event within the domain, identified as associated with the subscriber by the domain-specific identifier (e.g., ICID), is processed, in chronological order according to timestamp, by the DCR logic 60, beginning at block 62. If the event is not an SIP INVITE message (block 64) or an SIP BYE message (block 74), and the subscriber is in a VoLTE call session (block 76), then the event is stored in the DCR for this domain for this leg (block 78), along with the ICID-IMSI key, and processing for this event ends (block 72). The subscriber is determined to be in a VoLTE call session because the subscriber was so marked at block 66, and has not yet been marked as not in a VoLTE call session at block 84, as discussed below. All call measurements, events, and other data, identified as being associated with the subscriber by the domain-specific identifier (e.g., ICID), are subsequently processed by the DCR logic 60 in the same fashion, thus building a list of all events in the domain for this leg of the VoLTE call.

Pre-Correlation for Each Leg

The data collection process 60 collects all measurements, events, and other data, for each leg of the call, separately within each domain, using a domain-specific identifier associated with the subscriber. In a pre-correlation step 104, these data are associated with a single, common identifier, such as the subscriber's IMSI. To accomplish this, mappings are maintained between each domain-specific identifier (e.g., ICID, S1APID, etc.) and the common identifier (e.g., IMSI). See block 68. The pre-correlation processing is carried out separately for each leg of the call, using a common identifier (e.g., IMSI) associated with the subscriber for that leg. In the example depicted in FIG. 4, the pre-correlation step 104 occurs concurrently with the data collection step 102—as network data are determined to be relevant to a call leg (by their domain-specific identifier and timestamp), they are tagged with an ICID-IMSI key as they are stored for further processing (blocks 70, 78, 80). In other embodiments, data collected only using the domain-specific identifier can be post-processed to supply the mapping to a common identifier.

Termination of a Call Leg

As data and events for a call leg in a domain are logged, eventually an event identified by its domain-specific identifier is determined to be an SIP BYE message (block 74). This marks the end of the call leg, and the timestamp of the SIP BYE message is selected as the stop time of the call leg. The event (i.e., the SIP BYE message) is stored as the final event (block 80), along with the ICID-IMSI key, and the call leg is marked as complete and ready for further processing (block 82). The subscriber's status is changed to no longer in a VoLTE call session (block 84), so no further events associated with the subscriber (via the domain-specific identifier) are logged—that is, flow from block 76 will go straight to block 72.

Correlation of Call Legs and Assembling the DCR

After all the pre-correlation processing 104 is complete, all data for all legs of the VoLTE call has been collected. All data within each leg are identified by a common identifier (e.g., IMSI) and each event has a timestamp. Based on the timestamps, event streams from the different sources, in different domains 14, 20, 40, are merged (ordered by time). A DCR is assembled, in one embodiment, after the end of the BYE procedure is detected. The end of a call is detected for each of the individual call legs through separate BYE events, but only one DCR is generated per call. In one embodiment, this is achieved by independently tracking the legs involved in the call and their closure (block 86), and generating the DCR (block 88) only when the last leg is closed. BYE events may be missing for some of the call legs. This is handled in one embodiment by starting a time of a few seconds when the first BYE event in a call is processed. When the timer expires, the DCR is generated. After the DCR is generated, the call related events may be discarded (block 90).

To generate the DCR (block 88), a correlation step 106 correlates measurements, events, and other data for all the different legs of the VoLTE call, ordered chronologically by timestamp times. There are as many common identifiers (e.g., IMSIs) as legs of the call (which is the same as the number of subscribers, at least for mobile-to-mobile calls).

DCR Content

In general, a DCR may be organized in a number of ways. In one embodiment, a DCR has the following structure:
Header
  Type (Call setup, full call record, etc.)
  User IDs (both mobile originating and mobile terminating; IMSI, MSISDN, SIP ID)
  Call ID (e.g. IMS charging ID)
  Start, stop timestamps
  Start and end conditions (for the mobile originating and terminating part)
  Location
  Radio environment metrics (e.g. RSRP, RSRQ, QCI)
  Bearer info (bearer IDs, QoS parameters, APN, etc.)
Detailed event level information (for the mobile originating and terminating part), arranged by the different domains from which the data were obtained.
EPC domain 20
  Session and bearer setup (e.g. GTP-C protocol events or MME/SGW logs)
  Session and bearer management (e.g. GTP-C protocol events or MME/SGW logs)
  QoS information (e.g. GTP-C protocol events or MME/SGW logs)
  Handover information (core network signaling or MME logs)
  Location
RAN domain 14
  Radio environment statistics (e.g. RRC measurement report events or eNB logs)
  Handover information (e.g. S1AP protocol events or eNB logs)
  Radio environment statistics during handover (e.g. RRC protocol events or eNB logs)
  Cell quality information (eNB logs)
  Cell congestion (eNB logs)
  Cell health (eNB logs)

IMS domain 40
  Registration (IMS signaling)
  Call setup (IMS signaling)
  Call release (IMS signaling)

DCR Analysis

In one embodiment, an automated solution for analyzing the correlated data reported in DCR is a Rule Engine. A Rule Engine is used to generate incidents or triggers based on predefined rules and conditions. Rules apply different conditions, thresholds, ranges, and logical relations to the DCR fields, and generate an output, called incident or trigger. Additionally or alternatively, other forms of analysis may be applied.

The collected and correlated information content of a DCR, or multiple DCRs, can be used for detailed analysis and troubleshooting. Typical fault cases may be identified manually, automatically by machine learning, or automatically based on predefined conditions. These methods may be combined as well.

In case of manual analysis, the message sequences and the timing of the messages are investigated. Typical fault cases can be identified by investigating the content of the DCR and comparing the reported output with the expected output of the standard procedures. Based on the identified faults, typical patterns are defined for the different fault cases in the DCR.

The fault cases than can be configured in the Rule Engine. After that the Rule Engine generates an incident whenever a fault case occurs. In this case, it is possible to detect and identify automatically the identified fault cases in larger network areas and over many subscribers. It is also possible to quantify the frequency and distribution of the different fault cases.

Example 1

One example fault case is a dropped VoLTE call due to bad radio conditions. UE 12*a* initiated a call to UE 12*b*, which later terminated. Inspection of a DCR for the call may reveal that the VoLTE dedicated bearer activation was successful on both sides, based on the signaling traffic captured inside EPC 20. The call setup was successful, based on the signaling traffic captured inside IMS 40. During the call, both UE 12*a* and UE 12*b* performed a handover, based on RAN 14 and EPC 20 signaling. Both handover procedures failed. Based on periodic radio measurements, poor radio conditions led to failing handover procedures. The dedicated bearers were removed and the VoLTE call was dropped.

The detailed analysis of this scenario is possible because the following data sources would be correlated into a Detailed Call Record:
  mobile originated call setup record from the IMS 40;
  mobile terminated call setup record from the IMS 40;
  periodic radio measurements on eNBs 16*a*, 16*b*;
  handover procedures captured inside EPC 20 for both UEs 12*a*, 12*b*;
  bearer related procedures captured inside EPC 20 for both UEs 12*a*, 12*b*; and
  radio measurements during handover on eNBs 16*a*, 16*b*.

Example 2

Another example fault case is a failed VoLTE call setup due to bad radio conditions at the mobile terminating side. UE 12*a* attempted to initiate a call to UE 12*b*. The VoLTE dedicated bearer activation was successful on both sides, based on the signaling traffic captured inside EPC 40. The call setup failed at the mobile terminating side, based on the signaling traffic captured inside IMS 40, because the signaling message sequence from the terminating side was incomplete. This lead to the expiration of the call setup timer at IMS 40 and the call setup procedure was canceled. When the call setup was canceled, control was forwarded to a voice mail procedure. Based on the periodic radio measurements, poor radio conditions can be observed at the terminating side.

The detailed analysis of this scenario is possible because the following data sources are correlated into a Detailed Call Record:
  mobile originated call setup record from the IMS 40;
  mobile terminated call setup record from the IMS 40;
  periodic radio measurements on eNBs 16*a*, 16*b*; and
  bearer related procedures captured inside EPC 20 for both UEs 12*a*, 12*b*.

Method of Generating a DCR

Figure 5:
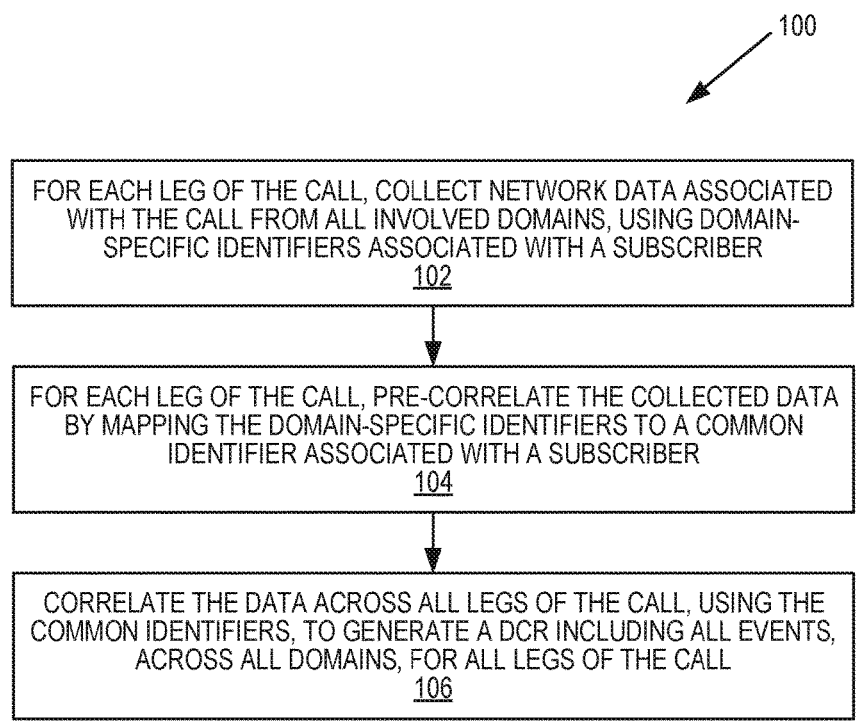
FIG. 5 is a flow diagram of a method of generating a DCR.

FIG. 5 depicts the steps in a method 100 of generating a Detailed Call Record (DCR) for a Voice over LTE (VoLTE) call in an LTE wireless communication network. For each leg of the call, network data associated with the call are collected from all involved domains 14, 20, 40, using domain-specific identifiers associated with a subscriber (block 102). Also for each leg of the call, the collected data are pre-correlated by mapping the domain-specific identifiers to a common identifier associated with a subscriber (block 104). Those of skill in the art will appreciate that steps 102 and 104 may occur concurrently or sequentially (or concurrently in one or more domains, and sequentially for another domain). When data collection 102 and pre-correlation 104 for all legs is complete (or times out), the data are correlated across all legs of the call, using the common identifiers, to generate a DCR including all events, across all domains, for all legs of the call (block 106).

Hardware and Software

Figure 6:
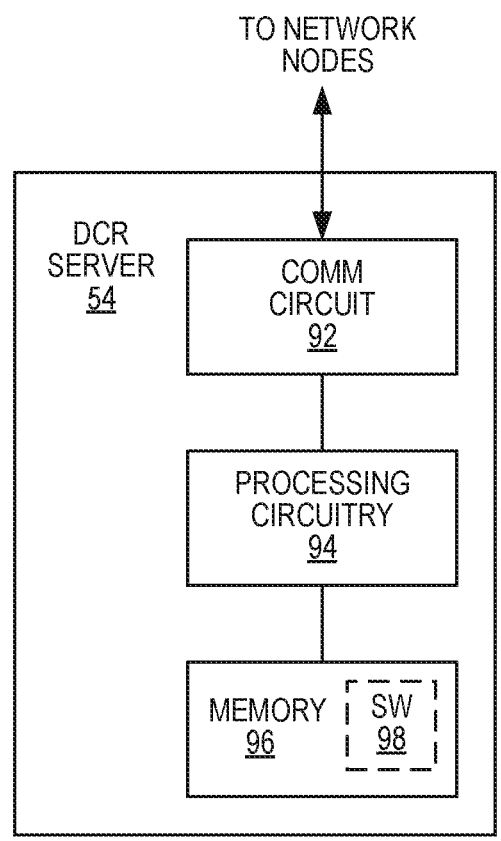
FIG. 6 is a block diagram of a computer operative to generate DCRs.

FIG. 6 is a block diagram of a computer, referred to herein as a DCR Server 54, operative to perform, e.g., the method 100. The DCR Server 54 includes communication circuits 92 operative to exchange messaging and data with numerous network nodes in all relevant domains—e.g., RAN 14, EPC 20, IMS 40, and the like. The communication circuits 92 may comprise a receiver and transmitter interface used to communicate with one or more other nodes over one or more communication channels or networks according to one or more communication protocols known in the art or that may be developed, such as Ethernet, TCP/IP, SONET, ATM, SIP, or the like. The communication circuits 92 implement receiver and transmitter functionality appropriate to the communication network links (e.g., optical, electrical, and the like). The transmitter and receiver functions may share circuit components and/or software, or alternatively may be implemented separately.

The DCR Server 54 also includes processing circuitry 94 operative to perform, e.g., the method 100. The processing circuitry 94 may each be implemented as a sequential state machine operative to execute machine instructions stored as machine-readable computer programs in memory 60, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The processing circuitry 94 is operatively connected to memory 96 operative to store machine-readable instructions, network event data, DCRs, and the like. The memory 96 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. Those of skill in the art will understand that the processing circuitry 94 may itself include memory, such as registers, cache, and the like. Those of skill in the art additionally understand that virtualization techniques allow some functions nominally executed by the processing circuitry 94 to actually be executed by other hardware, perhaps remotely located (e.g., in the so-called "cloud").

According to embodiments of the present invention, the memory 96 is operative to store, and the processing circuitry 94 is operative to execute, software 98 which when executed is operative to cause the DCR Server 54 to gather 102 measurements, events, and other data associated with a VoLTE call, pre-correlate 104 the data across all domains for each leg of the call, and correlate 106 the data between different legs of the call, as described and claimed herein.

Figure 7:
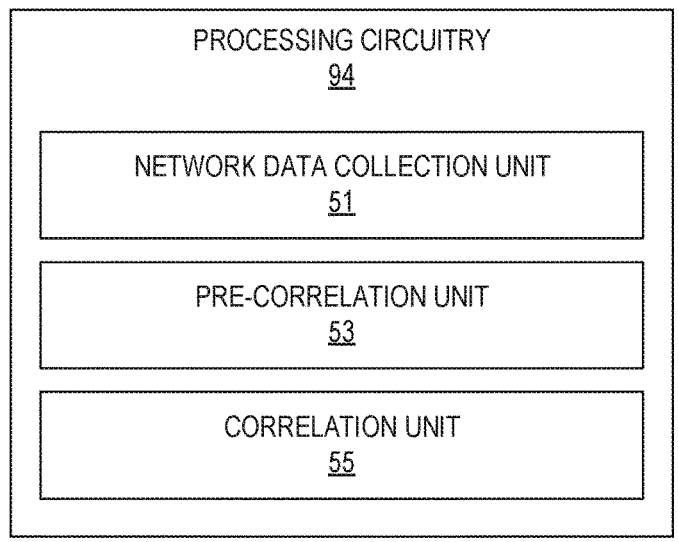
FIG. 7 is a block diagram of processing circuitry in the computer of FIG. 6.

FIG. 7 illustrates example processing circuitry 94, such as that in the DCR Server 54 of FIG. 6. The processing circuitry 94 comprises a plurality of physical units. In particular, the processing circuitry 94 comprises a network data collection unit 51, a pre-correlation unit 53, and a correlation unit 55. The network data collection unit 51 is configured to, for each leg of a VoLTE call, collect 102 network data associated with the call from all involved domains, using domain-specific identifiers associated with a subscriber. The pre-correlation unit 52 is configured to, for each leg of the call, pre-correlate 104 the collected data by mapping the domain-specific identifiers to a common identifier associated with a subscriber. The correlation unit 54 is configured to correlate 106 the data across all legs of the call, using the common identifiers, to generate a DCR including all events, across all domains, for all legs of the call.

Figure 8:
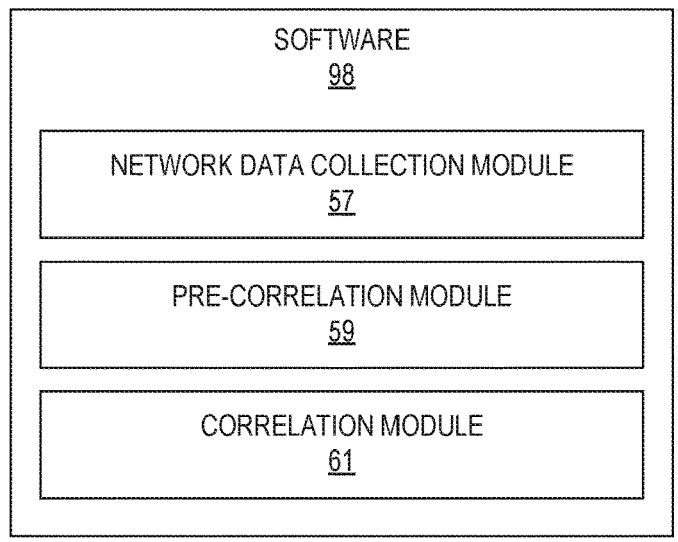
FIG. 8 is a block diagram of software executed by processing circuitry in the computer of FIG. 6.

FIG. 8 illustrates example software 98, such as that in the memory 96 of the DCR Server 54 of FIG. 6. The software 98 comprises a plurality of modules. In particular, the software 98 comprises a network data collection module 57, a pre-correlation module 59, and a correlation module 61. The network data collection module 57 is configured to, for each leg of a VoLTE call, collect 102 network data associated with the call from all involved domains, using domain-specific identifiers associated with a subscriber. The pre-correlation module 59 is configured to, for each leg of the call, pre-correlate 104 the collected data by mapping the domain-specific identifiers to a common identifier associated with a subscriber. The correlation module 61 is configured to correlate 106 the data across all legs of the call, using the common identifiers, to generate a DCR including all events, across all domains, for all legs of the call.

FIG. 9 illustrates a plurality of modules comprising a virtual function module architecture operative to generate Detailed Call Records (DCR) for Voice over LTE (VoLTE) calls. A first module 202 is configured to, for each leg of a VoLTE call, collect 102 network data associated with the call from all involved domains, using domain-specific identifiers associated with a subscriber. A second module 204 is configured to, for each leg of the call, pre-correlate 104 the collected data by mapping the domain-specific identifiers to a common identifier associated with a subscriber. A third module 206 is configured to correlate 106 the data across all legs of the call, using the common identifiers, to generate a DCR including all events, across all domains, for all legs of the call.

Advantages of Embodiments of the Present Invention

Embodiments of the present invention present numerous advantages over prior art wireless communication network 10 performance monitoring systems and methods. The Detailed Call Record reports the important successful and unsuccessful system related events affecting the user experience, in correlation with radio measurement data and all the relevant signaling details. These data are collected from multiple data sources, across all domains 14, 20, 40, for all call legs, and they are reported in time sequences with high granularity (e.g., seconds and sub-second, if needed). This enables: detecting a problem; localizing the problem (control plane, user plane, domain, node, etc.); and identifying the root cause of the problem (e.g., radio environment, signaling, user plane congestion, timing issue, or the like). These steps are obviously vital to solving the problem and similar problems in the network 10.

The inventive DCR-based approach is well suited for an automatic, real-time monitoring and troubleshooting system for a large subscriber base. This enables a centralized monitoring and troubleshooting system that replaces current practice such as drive tests and manual troubleshooting activities based on node logs, probe outputs, and traces of external tools. The system collects and correlates all the available performance monitoring events in all domains of the network that are related to specific calls. These network domains include, for example, the user terminal 12, radio access network 14, core network 20, and IMS 40. This enables the system to automatically localize the problem and identify the main root cause. Performance monitoring information is correlated per session, including the originating and terminating parties of the call. Based on events, relevant data are correlated, but not aggregated, so that individual analysis is possible.

The present invention may, of course, be carried out in other ways than those specifically set forth herein without departing from essential characteristics of the invention. The present embodiments are to be considered in all respects as illustrative and not restrictive.

What is claimed is:

1. A method of generating a Detailed Call Record (DCR) for a Voice over LTE (VoLTE) call in an LTE wireless communication network, characterized by:
   for each leg of the call, collecting network data associated with the call from all involved domains, using domain-specific identifiers associated with a subscriber;
   for each leg of the call, pre-correlating the collected data by mapping the domain-specific identifiers to a common identifier associated with a subscriber; and
   correlating the data across all legs of the call, using the common identifiers, to generate a DCR including all events, across all domains, for all legs of the call;
   wherein correlating the data across all legs of the call, using the common identifier, to generate a DCR comprises:
   extracting events related to voice calls by determining the start and end timestamp of the call for each leg, and selecting every event between the timestamps;

assigning an IMS Charging Identifier (ICID) to voice call events; and after detecting a termination message for the last leg of the call, assembling the extracted and identified events for each leg into a DCR.

2. The method of claim 1 wherein the domains include at least an Evolved Packet Core (EPC), Radio Access Network (RAN), and IP Multimedia Subsystem (IMS).

3. The method of claim 2 wherein data collected from the EPC domain includes one or more of: session and bearer setup data, session and bearer management data, Quality of Service (QoS) information, handover information, and location data.

4. The method of claim 3 wherein session and bearer setup or management data and QoS information includes at least one of GPRS Core Tunneling Protocol (GTP-C) events, Mobility Management Entity (MME) logs, and Serving Gateway (SGW) logs.

5. The method of claim 3 wherein handover information includes at least one of core network signaling and Mobility Management Entity (MME) logs.

6. The method of claim 2 wherein data collected from the RAN domain includes one or more of: radio environment statistics, handover information, radio environment statistics during handover, cell quality information, cell congestion, and cell status/availability.

7. The method of claim 6 wherein radio environment statistics include at least one of Radio Resource Control (RRC) measurement report events and eNB logs.

8. The method of claim 6 wherein handover information includes at least one of S1 (New) Application Protocol (S1AP) protocol events and eNB logs.

9. The method of claim 6 wherein radio environment statistics during handover include at least one of Radio Resource Control (RRC) protocol events and eNB logs.

10. The method of claim 6 wherein cell quality information, cell congestion, and cell status/availability include eNB logs.

11. The method of claim 2 wherein data collected from the IMS domain includes IMS signaling related to one or more of: registration, call setup, and call release data.

12. The method of claim 1 wherein the domain-specific identifiers comprise any of Mobile Station International Subscriber Directory Number (MSISDN), S1 Application Protocol Identifier (S1APID), IP Multimedia Public Identity (IMPU), and user IP address.

13. The method of claim 1 wherein the common identifier for each leg of the call is an International Mobile Subscriber Identity (IMSI) for that leg's associated subscriber.

14. The method of claim 1 wherein network data associated with the call includes user plane measurement data, radio measurement data, and control plane data.

15. The method of claim 1 wherein assigning an ICID to voice call events further comprises using an ICID-IMSI mapping and storing an ICID-IMSI key with each event.

16. The method of claim 1 wherein the DCR comprises:
a header including the call type, user identities for at least one subscriber, a call identification, and start and stop timestamps;
start and end conditions including location information, radio environment metrics, and bearer information; and
detailed event level information from each domain.

17. A computer communicatively connected to an LTE wireless communication network, and operative to generate a Detailed Call Record (DCR) for a Voice over LTE (VoLTE) call in the LTE network, characterized by:

communication circuits operative to exchange data with one or more LTE network nodes; and processing circuitry operatively connected to the communication circuits, and operative to:
for each leg of the call, collect network data associated with the call from all involved domains, using domain-specific identifiers associated with a subscriber;
for each leg of the call, pre-correlate the collected data by mapping the domain-specific identifiers to a common identifier associated with a subscriber; and
correlate the data across all legs of the call, using the common identifiers, to generate a DCR including all events, across all domains, for all legs of the call, wherein the processing circuit correlates the data across all legs of the call, using the common identifier, to generate a DCR by:
extracting events related to voice calls by determining the start and end timestamp of the call for each leg, and selecting every event between the timestamps;
assigning an IMS Charging Identifier (ICID) to voice call events; and
after detecting a termination message for the last leg of the call, assembling the extracted and identified events for each leg into a DCR.

18. A non-transitory computer-readable medium containing program instructions which, when executed on processing circuitry communicatively coupled to an LTE wireless communication network, are operative to cause the processing circuitry to generate a Detailed Call Record (DCR) for a Voice over LTE (VoLTE) call in the LTE network by performing the steps of:
for each leg of the call, collecting network data associated with the call from all involved domains, using domain-specific identifiers associated with a subscriber;
for each leg of the call, pre-correlating the collected data by mapping the domain-specific identifiers to a common identifier associated with a subscriber; and
correlating the data across all legs of the call, using the common identifiers, to generate a DCR including all events, across all domains, for all legs of the call, wherein correlating the data across all legs of the call, using the common identifier, to generate a DCR by:
extracting events related to voice calls by determining the start and end timestamp of the call for each leg, and selecting every event between the timestamps;
assigning an IMS Charging Identifier (ICID) to voice call events; and
after detecting a termination message for the last leg of the call, assembling the extracted and identified events for each leg into a DCR.

19. An apparatus communicatively connected to an LTE wireless communication network, and operative to generate a Detailed Call Record (DCR) for a Voice over LTE (VoLTE) call in the LTE network, the apparatus adapted to:
for each leg of the call, collect network data associated with the call from all involved domains, using domain-specific identifiers associated with a subscriber;
for each leg of the call, pre-correlate the collected data by mapping the domain-specific identifiers to a common identifier associated with a subscriber; and
correlate the data across all legs of the call, using the common identifiers, to generate a DCR including all events, across all domains, for all legs of the call, wherein the apparatus is adapted to correlate of the data across all legs of the call, using the common identifier, to generate a DCR by:

extracting events related to voice calls by determining the start and end timestamp of the call for each leg, and selecting every event between the timestamps;

assigning an IMS Charging Identifier (ICID) to voice call events; and after detecting a termination message for the last leg of the call, assembling the extracted and identified events for each leg into a DCR.

* * * * *